United States Patent
Corre et al.

(10) Patent No.: US 10,502,864 B2
(45) Date of Patent: Dec. 10, 2019

(54) METHOD AND DEVICE FOR DETERMINING DAMAGE TO A GEOLOGICAL MODEL

(71) Applicant: TOTAL SA, Courbevoie (FR)

(72) Inventors: Bernard Corre, Pau (FR); Alexandre Lapene, Pau (FR); Rafik Affes, Pau (FR)

(73) Assignee: TOTAL SA, Courbevoie (FR)

( * ) Notice: Subject to any disclaimer, the term of this patent is extended or adjusted under 35 U.S.C. 154(b) by 652 days.

(21) Appl. No.: 15/103,244

(22) PCT Filed: Nov. 25, 2014

(86) PCT No.: PCT/FR2014/053025
§ 371 (c)(1),
(2) Date: Oct. 12, 2016

(87) PCT Pub. No.: WO2015/086941
PCT Pub. Date: Jun. 18, 2015

(65) Prior Publication Data
US 2017/0023701 A1    Jan. 26, 2017

(30) Foreign Application Priority Data
Dec. 9, 2013 (FR) ...................................... 13 62311

(51) Int. Cl.
*G01V 99/00* (2009.01)
*G06F 17/50* (2006.01)

(52) U.S. Cl.
CPC ........ *G01V 99/005* (2013.01); *G06F 17/5009* (2013.01); *G06F 17/5018* (2013.01); *G06F 2217/16* (2013.01)

(58) Field of Classification Search
CPC .............. G01V 99/005; G06F 17/5009; G06F 17/5018; G06F 2217/16
(Continued)

(56) References Cited

U.S. PATENT DOCUMENTS

| 5,625,575 A | * | 4/1997 | Goyal ................. G06F 17/5009 |
| | | | 703/6 |
| 7,043,410 B2 | * | 5/2006 | Malthe-Sorenssen ...................... |
| | | | G01V 1/282 |
| | | | 702/14 |

OTHER PUBLICATIONS

Yates, "Elastic Behaviour of a regular lattice for a meso-scale modelling of solids", 2012, Elsevier, International Journal of Solids and Structures (Year: 2012).*

(Continued)

*Primary Examiner* — Kamini S Shah
*Assistant Examiner* — Faraj Ayoub
(74) *Attorney, Agent, or Firm* — Patterson Thuente Pedersen, P.A.

(57) ABSTRACT

The present invention relates to the determination of damage to a geological model comprising a plurality of nodes and a plurality of links each linking two nodes from the plurality of nodes. For each link from the plurality of links, the determination of damage comprises determining a force applied to said link. If the force is greater than a force threshold value, for each node of the two nodes from the plurality of nodes linked together by said link, the determination of damage comprises creating a contact sphere associated with said node, and eliminating the link. The determination of damage comprises determining a plurality of contacts between spheres comprising at least one contact between spheres, each contact between spheres associating two contact spheres from the plurality of contact spheres.

9 Claims, 5 Drawing Sheets

(58) Field of Classification Search
USPC .......................................................... 703/10
See application file for complete search history.

(56) References Cited

OTHER PUBLICATIONS

International Search Report for PCT/FR2014/053025, dated May 18, 2015, 3 pages.
English translation of International Search Report for PCT/FR2014/53025, dated May 18, 2015, 1 pages.
I. Omelyah et al: "Optimized verlet-like algorithms for molecular dynamic simulations", Physical Review E, vol. 65, No. 5, May 2002 (May 2002), XP055131955, ISSN: 1063-651X, DOI: 10.1103/PhysRevE.65.056706 abstract.

* cited by examiner

METHOD AND DEVICE FOR DETERMINING DAMAGE TO A GEOLOGICAL MODEL

RELATED APPLICATIONS

The present application is a National Phase entry of PCT Application No. PCT/FR2014/03025, filed Nov. 25, 2014, which claims priority from FR Patent Application 13 62311, filed Dec. 9, 2013, said applications being hereby incorporated by reference herein in their entirety.

FIELD OF THE INVENTION

The present invention relates to a device and method for determining damage to a geological model.

BACKGROUND OF THE INVENTION

The present invention relates to the field of the determination of damage to a geological formation element suitable for modelling a rock type material subject to structural changes such as deformations, cracking, fragments with interactions between the fragments, within the framework of the investigation and operation of hydrocarbons, in liquid or gas form from kerogen pyrolysis.

The material modelled is for example a bituminous schist which is a heterogeneous material consisting of mother rock (also known as kerogen) and minerals. The kerogen may be led to undergo pyrolysis, natural or induced, during which it is particularly converted into hydrocarbons, in liquid of gas form, associated with other compounds such as $CO_2$, $H_2O$, etc. Such phase changes of the kerogen, essentially by releasing pressurised gas, generate considerable stress in the material and are a source of deformations, cracking and fragmentations of the material.

Modelling the damage of a material subject to such structural changes in a given geological formation is useful in the context of the investigation and production of hydrocarbons or gas in bituminous schists as such modelling makes it possible to estimate the effect of induced pyrolysis on the kerogen contained in the formation, and as such the available resources associated with said formation, the future production and, therefore, the economic value of the field.

There are a number of approaches for modelling the behaviour of materials under stress that can be grouped into two major categories: continuous approaches and discrete approaches.

Continuous approaches account for the behaviour of the different phases of the material and the physics of the problem in the form of behaviour laws formulated in partial derivative equations. Finite element resolution methods are used to solve these equations.

The drawbacks of continuous approaches are numerous when it is sought to apply them to heterogeneous materials such as bituminous schists. These approaches require an extremely fine mesh to be able to account for the microstructural heterogeneities of the bituminous schists and thus a considerable computing time. Furthermore, behaviour laws in finite elements are not suitable for correctly addressing the problem of damage to materials once phenomena such as crack opening and propagation have a predominant role, which is particularly the case during the structural change of bituminous schists.

Discrete approaches have been developed with a view to modelling non-cohesive divided materials such as granular materials. In these methods, the material is described as a collection of rigid and independent bodies, particles, which interact with one another by means of force laws linking the contact force with a deformation variable associated with contact (defined by means of rigid degrees of freedom of the particles). The change to the system is then obtained by integrating motion equations. The interactions in question, such as cohesion, contact or friction, differ according to the method, the layouts thereof and the target application. Discrete approaches are grouped under the term "DEM", standing for "Discrete Element Method", by opposition with finite element methods.

"DEM" methods are generally unsuitable for modelling continuous materials. Indeed, particle deformation and damage are not taken into consideration and crack propagation merely takes place by the rupture of cohesive links and by bypassing particles. Furthermore, the overall behaviour of the material is the result of a large number of interactions on a particulate scale. The mechanical properties of the material are thus resultant properties and cannot be introduced directly into the discrete formulation as in the case of continuous methods. Moreover, in three dimensions, the use of spherical particles offers optimum numerical performance due to the ease of management of contacts but introduces an artificial void phase into the material. The use of other forms of particles requires the management of more complex contacts and thus a greater computing time. Finally, the initial geometric configuration of the discrete domain can have a great impact on the mechanical behaviour of the material and phenomena such as crack propagation along preferential paths or non-uniform diffusion of elastic waves can be observed.

A third approach has been proposed to overcome these drawbacks, referred to as the lattice model. In this approach, the material is not represented by a set of volume elements, as in the continuous approach, or by a set of extended rigid bodies in contact, as in the discrete approach, but by a distribution of points, nodes, interlinked by interaction laws, links. Only local laws, such as the equilibrium of forces and moments, are taken into consideration, and the implementation thereof is performed at each node linked to a limited and defined number of adjacent nodes.

This numerical approach makes it possible to model the phases of the material and optionally the interfaces thereof on a lattice of one-dimensional elements, links, which may have different rheological behaviours. The complexity of the microstructure and the behaviour of the phases thereof are thus taken into account.

The links linking the nodes make it possible to model the mechanical behaviour of the different geological phases of the material and usually have a fragile rheological behaviour characterised by a rigidity linked with the elastic modulus of the geological phase in question and a force rupture threshold linked with the rupture stress of said geological phase.

Crack formation in the geological model is then taken into account through the elimination of links between nodes when a force applied to a link is greater than a force threshold value of the link.

However, this method has drawbacks and is not suitable for modelling in a satisfactory manner damage to the geological model beyond the mere opening of a crack. As such in particular, once a link has been broken, the two nodes originally linked by said link, and forming the two lips of the crack, do not interact with one another. This method is thus not suitable for simulating crack propagation, material deformations, multiple crack formations and fragmentations with interactions between the material fragments.

There is thus a need for a method for determining damage to a geological model capable of accounting for microstructural heterogeneities, reliably modelling the deformation of the geological phases of the material, and simulating phenomena such as the opening and propagation of cracks which play a predominant role during the structural change of bituminous schists.

The present invention improves the situation.

SUMMARY OF THE INVENTION

To this end, the present invention proposes using a combined approach based on the lattice model and on molecular dynamics to model the mechanical behaviour of and damage to a geological model.

The present invention thus relates to a method for determining damage to a geological model, said geological model comprising a plurality of nodes and a plurality of links, each link from the plurality of links linking together two nodes from the plurality of nodes.

The method comprises the following steps,
for each link from the plurality of links:
  determining a force applied to said link,
  if said force is greater than a force threshold value:
    for each node of the two nodes from the plurality of nodes linked together by said link, creating a contact sphere associated with said node, and eliminating said link,
  determining a plurality of contacts between spheres comprising at least one contact between spheres, each contact between spheres associating two contact spheres from the plurality of contact spheres.

"Contact spheres" are bodies having a certain spatial extension and suitable for interacting in pairs by contact interactions: "contacts between spheres". As such, unlike nodes, the neighbours of each contact sphere, with which said contact sphere interacts, are not determined in principle but may progress over time with the damage to the geological model.

In this way, it is for example possible to model accurately the relative displacement of the lips of a crack. It is also possible to model the interaction of fragments of the geological model with one another.

In one embodiment, for each contact between spheres from the plurality of contacts between spheres, the method may comprise
  determining an interaction force between the two contact spheres associated by said contact between spheres,
  for each link from the plurality of links such that, of the two nodes from the plurality of nodes linked together by said link, at least one node is associated with a contact sphere associated with said contact between spheres, transmitting said interaction force to said link.

In one embodiment of the method, with each contact between spheres from the plurality of contacts between spheres is associated
  a plane of contact between spheres,
  a normal component of the interaction force, normal to the plane of contact between spheres,
  a tangential component of the interaction force, comprised in the plane of contact between spheres,
  and
  the normal component of the interaction force is a component proportional to an interpenetration distance of the two contact spheres associated by said contact between spheres, and
  the tangential component of the interaction force is a component of opposite direction to a relative tangential displacement of the two contact spheres associated by said contact between spheres and modulus proportional to said relative tangential displacement.

In one embodiment of the method, a rigidity value, a force threshold value and a reference length value are associated with each link from the plurality of links, said rigidity values and force threshold values being determined on the basis of elastic modulus values E and tensile strength threshold values σ of at least one geological phase modelled by the geological model.

In one embodiment of the method, the links from the plurality of links and the nodes from the plurality of nodes are arranged in a disordered regular lattice, preferably in a lattice such as a statistical distribution of reference length values or a statistical distribution of rigidity values, associated with the links from the plurality of links, is a unimodal statistical distribution.

In one embodiment, the method further comprises the following steps,
  applying a plurality of limit conditions to a plurality of limit nodes from the plurality of nodes,
  for each node from the plurality of nodes, determining a spatial position of said node.

In one embodiment of the method, the determination of a spatial position for each node from the plurality of nodes comprises either a minimisation of a potential energy of the geological model, or an integration of a plurality of motion equations associated with the nodes.

In one embodiment of the method:
  a first plurality of nodes from the plurality of nodes of the geological model is associated with a first geological phase modelled by the geological model,
  a second plurality of nodes from the plurality of nodes of the geological model is associated with a second geological phase modelled by the geological model,
  a plurality of first geological phase links from the plurality of links of the geological model consists of links from the plurality of links linking together two nodes from the first plurality of nodes, with each link from the plurality of first geological phase links is associated a first geological phase rigidity value and a first geological phase force threshold value determined on the basis of elastic modulus values E and tensile strength threshold values σ of the first geological phase modelled by the geological model,
  a plurality of second geological phase links from the plurality of links of the geological model consists of links from the plurality of links linking together two nodes from the second plurality of nodes, with each link from the plurality of second geological phase links is associated a second geological phase rigidity value and a second geological phase force threshold value determined on the basis of elastic modulus values E and tensile strength threshold values σ of the second geological phase modelled by the geological model, and
  a plurality of interface links from the plurality of links of the geological model consists of links from the plurality of links linking together a node from the first plurality of nodes and a node from the second plurality of nodes, with each link from the plurality of interface links is associated an interface rigidity value and an interface force threshold value,
  and
  a first geological phase rigidity value is different to a second geological phase rigidity value and/or a first geological phase force threshold value is different to a second geological phase force threshold value.

A device for determining damage to a geological model may be advantageous, per se, insofar as it is suitable for determining damage to a geological model.

As such, the present invention also relates to a device for determining damage to a geological model, said geological model comprising a plurality of nodes and a plurality of links, each link from the plurality of links linking together two nodes from the plurality of nodes.

The device comprises a circuit suitable for,
for each link from the plurality of links:
determining a force applied to said link,
if said force is greater than a force threshold value:
for each node of the two nodes from the plurality of nodes linked together by said link, creating a contact sphere associated with said node, and eliminating said link,
determining a plurality of contacts between spheres comprising at least one contact between spheres, each contact between spheres associating two contact spheres from the plurality of contact spheres.

A computer program, implementing all or part of the method described above, installed on pre-existing equipment, is advantageous per se, insofar as it is suitable for determining damage to a geological model.

As such, the present invention also relates to a computer program comprising instructions for the implementation of the method described above, when this program is executed by a processor.

This program can use any programming language (for example, an object or other language), and be in the form of an interpretable source code, a partially compiled code or a fully compiled code.

FIG. 2 described in detail hereinafter can form the organisation diagram of the general algorithm of such a computer program.

Further features and advantages of the invention will emerge further on reading the description hereinafter. This is merely illustrative and should be read with reference to the appended drawings wherein:

DETAILED DESCRIPTION OF THE DRAWINGS

Figure 1:
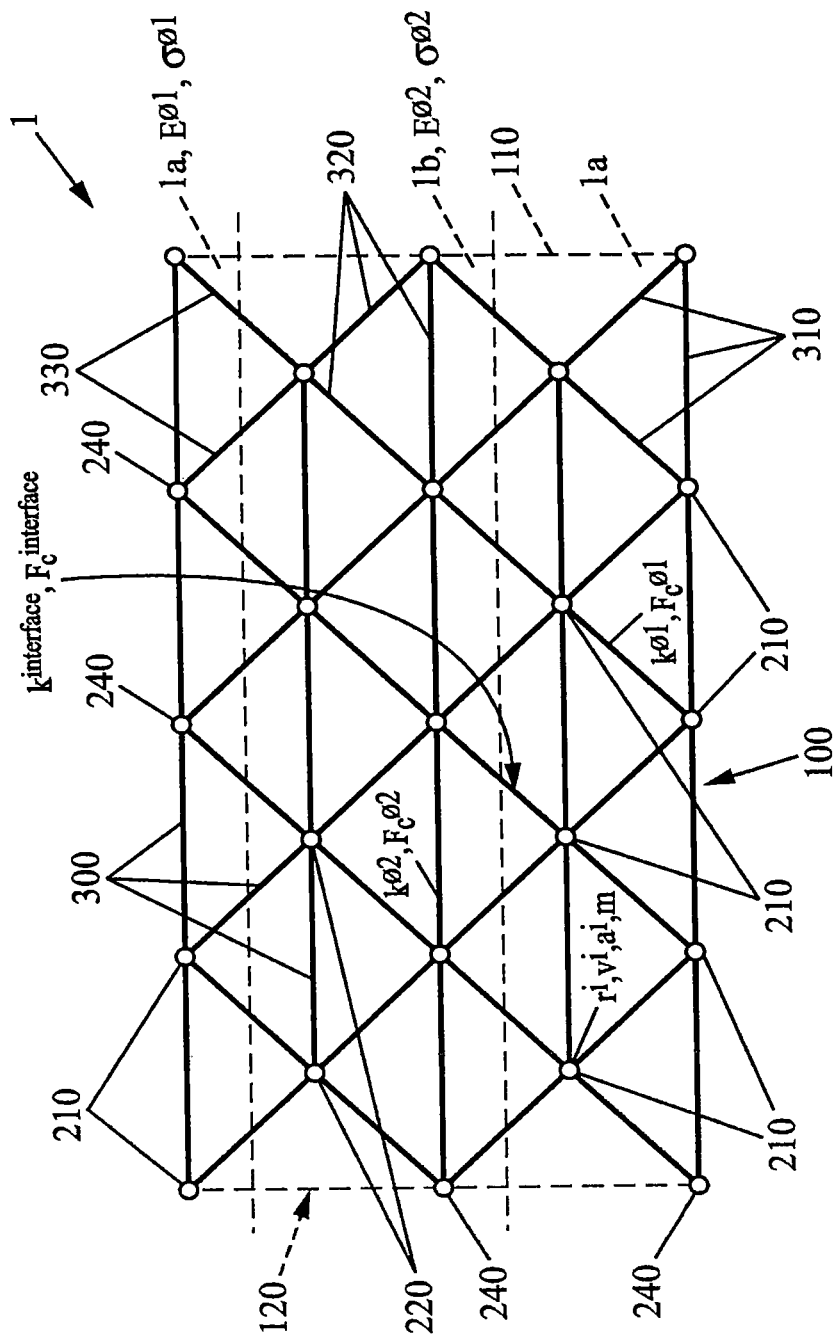
FIG. 1 illustrates a geological model for the operation of a possible method according to the invention.

FIG. 1 illustrates a geological model 100 for the operation of a possible method according to the invention.

Such a geological model 100 is in particular suitable for modelling, or representing, an originally consolidated, homogeneous or heterogeneous rock type material 1, and intended to undergo significant structural changes such as deformations, multiple crack formation, fragmentations with interactions between the fragments.

The geological model 100 is particularly suitable for representing a material 1 comprising a plurality of geological phases 1a, 1b having distinct mechanical characteristics. The term "a material comprising a plurality of geological phases" denotes a heterogeneous material consisting of a plurality of portions which may differ for example by the chemical compositions thereof, the mechanical characteristics thereof and/or the state thereof (solid, fluid, gas). The geological model may thus exhibit heterogeneities of varying dimensions.

Figure 2:
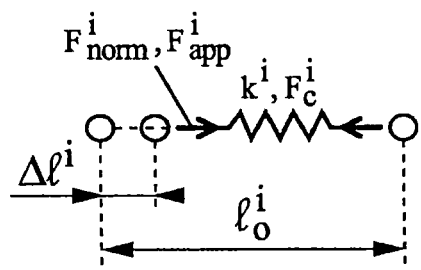
FIG. 2 illustrates a link linking two nodes of a geological model for the operation of a possible method according to the invention.

The geological model 100 comprises a plurality of nodes 200 and a plurality of links 300. As illustrated in FIGS. 1 and 2, each link i of the plurality of links 300 links together two nodes i, j of the plurality of nodes 200.

As such, the material 1 is not represented by a set of volume elements, as in finite elements, but by a distribution of points, the nodes 200, linked to one another by interaction laws, the links 300.

The links 300 make it possible to transmit forces between nodes 200.

In one embodiment of the invention, the links 300 merely transmit a normal force $f_{norm}$ between the nodes 200. The links may thus have for example a fragile spring behaviour. With each link i from the plurality of 300 is then associated a rigidity value $k^i$, a force threshold value $f_c^i$ and a reference length value $l_0^i$.

The force threshold value $f_c^i$ defines a maximum force applicable to the link i before said link is broken as described in more detail hereinafter.

The reference length values $l_0$ are for example defined according to the lowest heterogeneity of the geological model 100, and in such a way as to suitably represent said lowest heterogeneity, for example such that said lowest heterogeneity comprises a predefined number of nodes 200, preferably greater than or equal to a node 200.

The rigidity value $k^i$ and the reference length value $l_0^i$ are suitable for associating with each link a normal force $f_{norm}^i$ proportional to an elongation $\Delta l^i$ of the link i such that $$f_{norm}^i = k^i \Delta l^i$$

In one alternative embodiment, the normal force $f_{norm}^i$ may be a non-linear function of the elongation $\Delta l^i$ of the link, the rigidity value $k^i$ and the reference length value $l_0^i$.

In a further embodiment of the invention, the links may transmit, in addition to the normal force $f_{norm}$, a shearing force and a moment. In such an embodiment, the links then represent "beams" linking the nodes.

The rigidity values $k^i$ and the force threshold values $f_c^i$ associated with each link i from the plurality of links may advantageously be determined on the basis of the elastic modulus values E and the tensile strength threshold values σ of the geological phases 1a, 1b modelled by the geological model 100.

As illustrated in FIG. 1, the nodes from the plurality of nodes 200 and the links from the plurality of links 300 are arranged in a lattice 120. In one embodiment of the invention, said lattice 120 is a three-dimensional lattice. In one alternative embodiment, said lattice 120 may be a two-dimensional lattice or even a one-dimensional lattice.

In particular, the links from the plurality of links 300 may be arranged in a disordered regular lattice 120. The term "disordered regular lattice" denotes for example a lattice such that the links from the plurality of links 300 have on average the same reference length value $l_0$ with a standard device different to zero, i.e. a lattice such that a statistical distribution of reference length values $l_0^i$ associated with the links i from the plurality of links 300 is a unimodal statistical distribution, for example with a single mode $l_0$, in particular a unimodal statistical distribution with a standard deviation different to zero.

The term "disordered regular lattice" also denotes a lattice such that the links from the plurality of links 300 have on average the same rigidity value k with a standard deviation different to zero, i.e. a lattice such that a statistical distribution of rigidity values $k^i$ associated with the links i from the plurality of links 300 is a unimodal statistical distribution, for example with a single mode k, in particular a unimodal statistical distribution with a standard deviation different to zero.

For this, it is possible for example to arrange the nodes from the plurality of nodes 200 and the links from the plurality of links 300 in a perfectly regular lattice 120 (with a zero standard deviation) and then apply a controlled disorder to the positions of said nodes, to the reference length values $l_0$ of the links or to the rigidity values k of the links so as to form a disordered regular lattice.

Applying a controlled disorder makes it possible to eliminate, or at least reduce, the preferred fracture directions of the geological model 100 linked with the lattice 120 model.

Said three-dimensional regular lattice 120 may for example be a tetrahedral lattice.

As mentioned above, the geological model 100 may in particular model a material 1 comprising a plurality of geological phases and comprising for example at least a first geological phase 1a and a second geological phase 1b.

As illustrated in FIG. 1, a first plurality of nodes 210 from the plurality of nodes 200 of the geological model 100 is thus associated with the first geological phase 1a modelled by the geological model. A second plurality of nodes 220 from the plurality of nodes 200 of the geological model is thus associated with the second geological phase 1b modelled by the geological model.

The same considerations apply to the links 300 such that a plurality of first geological phase links 310 from the plurality of links of the geological model consists of links from the plurality of links linking together two nodes from the first plurality of nodes 210.

With each link from the plurality of first geological phase links 310 is associated a first geological phase rigidity value $k^{\Phi 1}$ and a first geological phase force threshold value $f_c^{\Phi 1}$.

The first geological phase rigidity value $k^{\Phi 1}$ and the first geological phase force threshold value $f_c^{\Phi 1}$ may in particular be defined by a first geological phase elastic modulus value $E^{\Phi 1}$ modelled by the geological model and a first geological phase tensile strength threshold value $\sigma^{\Phi 1}$ modelled by the geological model, Similarly, a plurality of second geological phase links 320 from the plurality of links 300 of the geological model consists of links from the plurality of links linking together two nodes from the second plurality of nodes 220. With each link from the plurality of second geological phase links 320 is associated a second geological phase rigidity value $k^{\Phi 2}$ and a second geological phase force threshold value $f_c^{\Phi 2}$ which are defined by a second geological phase elastic modulus value $E^{\Phi 2}$ modelled by the geological model and a second geological phase tensile strength threshold value $\sigma^{\Phi 2}$ modelled by the geological model.

Finally, interface links 330 may also be defined. A plurality of links 330 from the plurality of links 300 of the geological model thus consists of links from the plurality of links linking together a node from the first plurality of nodes 210 and a node from the second plurality of nodes 220.

With each link from the plurality of interface links 330 is associated an interface rigidity value $k^{interface}$ and an interface force threshold value $f_c^{interface}$.

The mechanical characteristics of the first geological phase 1a and the second geological phase 1b may differ. As such, the first geological phase may for example model a mother rock whereas the second geological phase may model kerogen, a fluid or even a gas.

A first geological phase rigidity value $k^{\Phi 1}$ and/or a first geological phase force threshold value $f_c^{\Phi 1}$ may thus be different to a second geological phase rigidity value $k^{\Phi 2}$ and/or a second geological phase force threshold value $f_c^{\Phi 2}$.

The mechanical characteristics of the interfaces, i.e. in particular the values $k^{interface}$ and $f_c^{interface}$ associated with the interface links 330, may be different to the values associated with the links of the first geological phase 210 and the second geological phase 220 or be identical to the values of one of said geological phases 1a, 1b. The mechanical characteristics of the interfaces may for example be calibrated by measurements on material test samples.

Figure 3A:
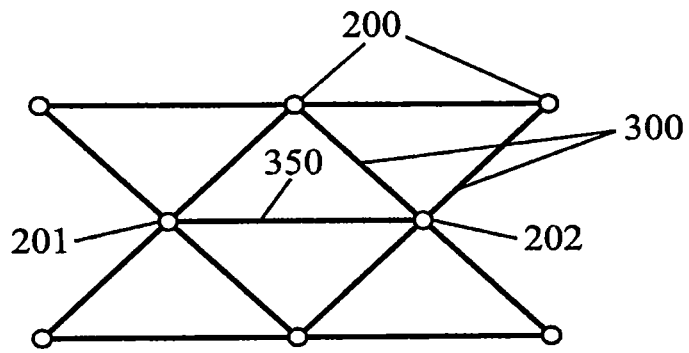
FIG. 3a illustrates a detail of a geological model comprising to a link to be broken during the implementation of a possible method according to the invention.
Figure 3B:
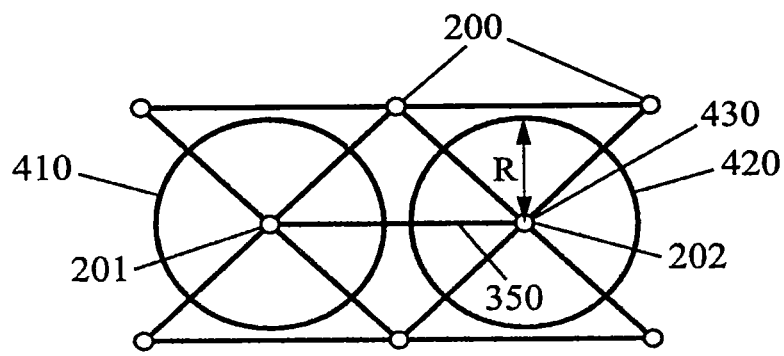
FIG. 3b illustrates the detail of a geological model in FIG. 3a comprising a link to be broken and two contact spheres during the implementation of a possible method according to the invention.
Figure 3C:
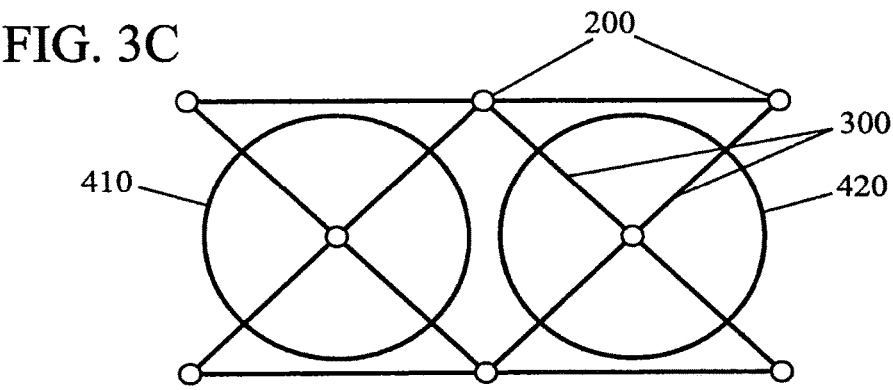
FIG. 3c illustrates the detail of a geological model in FIG. 3b comprising two contact spheres and wherein the link to be broken has been eliminated during the implementation of a possible method according to the invention.
Figure 3D:
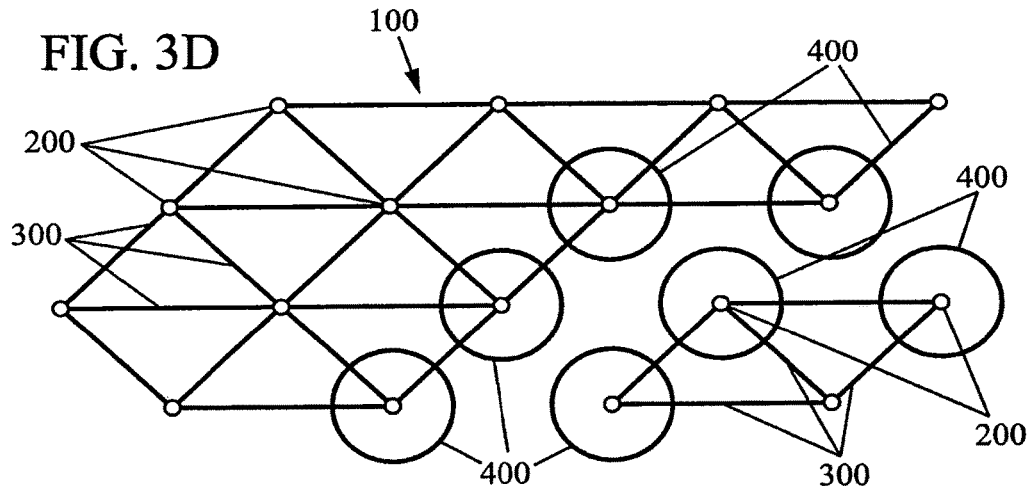
FIG. 3d illustrates a geological model during the implementation of a possible method according to the invention wherein a plurality of links to be broken has been eliminated.
Figure 4:
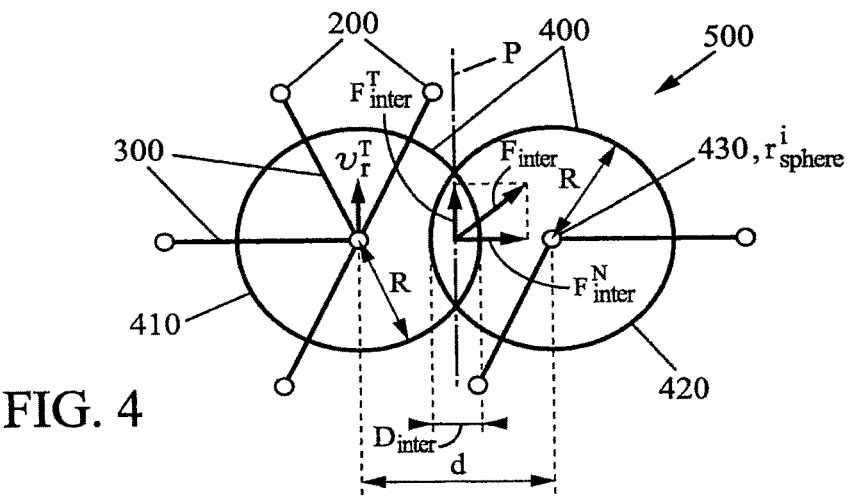
FIG. 4 illustrates a detail of a geological model comprising a contact between spheres during the implementation of a possible method according to the invention.
Figure 5:
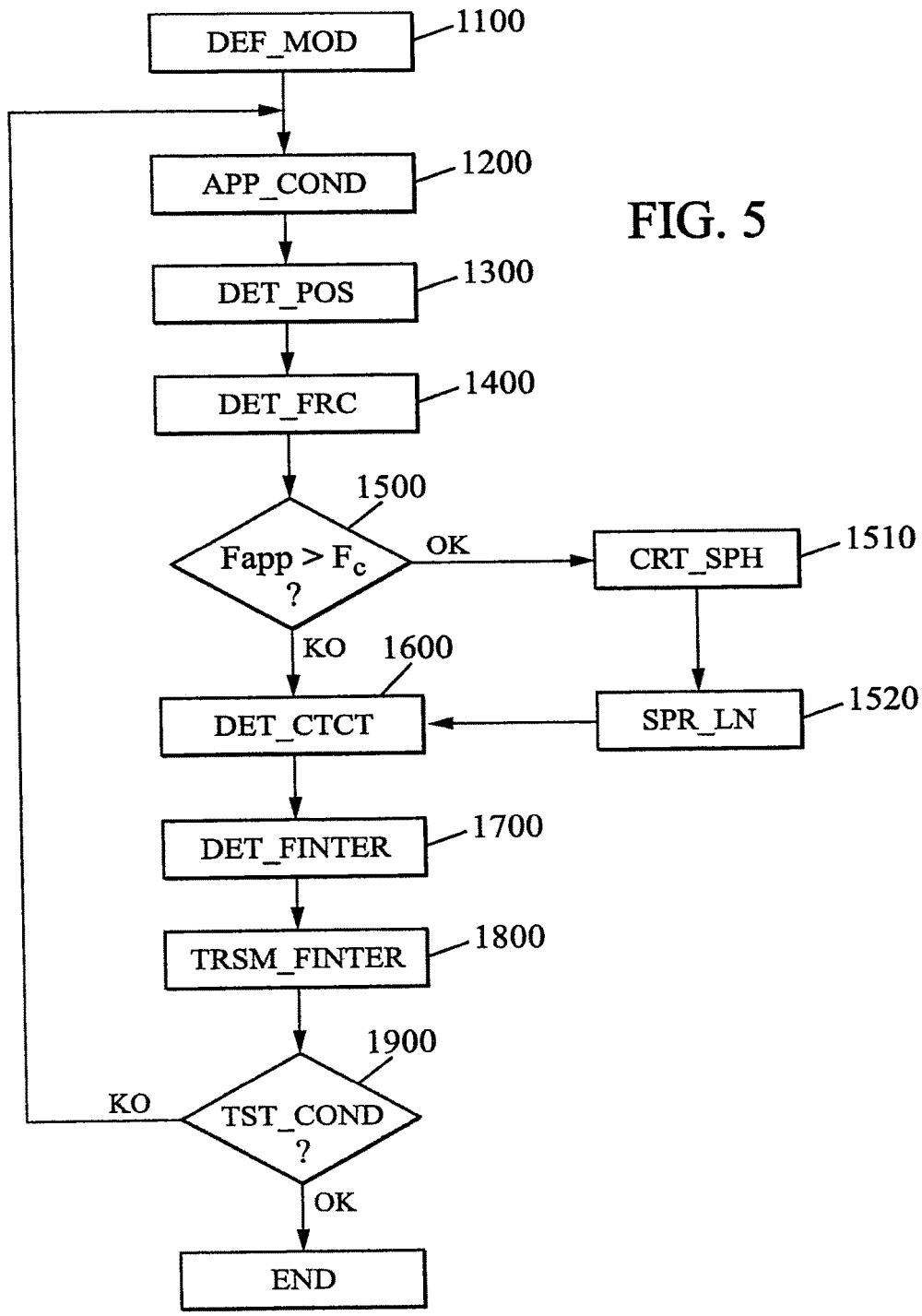
FIG. 5 illustrates a functional diagram of a method in one embodiment according to the invention.
Figure 6:
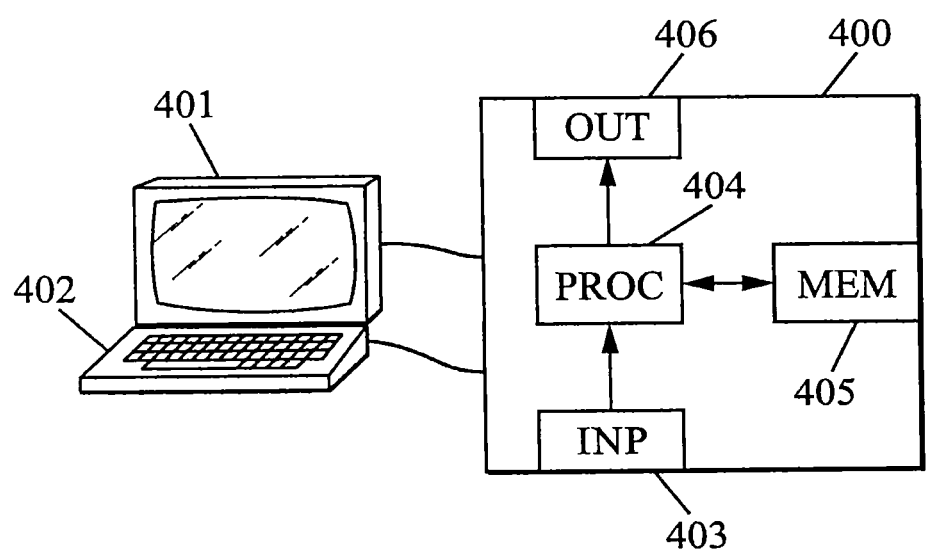
FIG. 6 illustrates a computing device for implementation according to one embodiment of the invention.

FIG. 5, with reference to FIGS. 3a to 3d and 4, illustrates a functional diagram of a method in one embodiment according to the invention.

The operating mode described in this figure is merely one of the possible operating modes of the invention.

A preliminary step of the method (step 1100, DEF_MOD) comprises the definition of the geological model 100 by associating with each node i from the plurality of nodes an initial spatial position $r_{init}^i$ and defining the rigidity, force threshold and reference length values associated with the links from the plurality of links. This geological model 100 as defined in an initial geological model which will be modified during the implementation of the method which will be detailed hereinafter.

With reference to FIG. 2, a step of the method then comprises the application of a plurality of limit conditions to the geological model (step 1200, APP_COND).

In one embodiment, the limit conditions may be applied to a plurality of limit nodes 240 from the plurality of nodes 200.

In a first embodiment, the limit nodes 240 may be nodes forming the outer spatial contour 110 of the geological model 100. The limit nodes 240 then usually have a lower number of neighbours than the other nodes of the geological model.

In a second embodiment, the limit nodes 240 may be nodes arranged inside the geological model 100, in particular any nodes of the geological model 100.

In this second embodiment, it is then possible to apply limit conditions to an internal portion of the material. By way of example, this embodiment is thus suitable for determining the damage to a material subjected to specific forces following a phase change of an internal portion of the material or an expansion or contraction of said internal portion, for example in response to a temperature rise or fall of said internal portion.

The application of said limit conditions may for example comprise a displacement of the spatial position of said limit nodes 240.

In a further embodiment, the application of limit conditions may for example comprise the application of a force to said limit nodes 240.

A subsequent step of the method comprises the determination of a spatial position of the nodes from a plurality of nodes (step 1300, DET_POS).

Such a step for determining a spatial position may be implemented in various ways.

In a first embodiment, the spatial position $r_i$ of each node i from the plurality of nodes 200 is determined by minimising a potential energy $\varepsilon_p$ of the geological model 100.

In the local reference of a node i, the potential energy of a link linking the node i to a node j is given by:

$$\delta \varepsilon_p^{ij} = \frac{1}{2} k \|r_j - r_j'\|^2$$

where $r_j$ and $r_j'$ are respectively the initial position and the position after a displacement of the node j.

A total potential energy is then obtained by summing:

$$\varepsilon_p = \sum_{ij} \delta \varepsilon_p^{ij}$$

It is for example possible to minimise such a potential energy $\varepsilon_p$ using a conjugate gradient method such as the Hestenes-Stiefel method.

In a second embodiment, the spatial position $r_i$ of each node i from the plurality of nodes 200 is determined by integrating a plurality of motion equations associated with the nodes.

In this method, the change to the geological model 100 is modelled temporally. The dynamics of the nodes 200 may then be calculated at each time t by implementing an integration algorithm which consists of determining, at the time t+Δt, for each of the nodes i, the position $r_i$, the velocity $v_i$ and the acceleration $a_i$ of said node i in a global reference of the geological mode 100, according to the position, velocity and acceleration of the nodes at the time t, along with forces applied and transmitted to the node by the links.

For this purpose, it is possible for example to implement an algorithm such as Verlet integration.

More specifically, for each node i from the plurality of nodes, the position $r_i$ and the velocity $v_i$, at the time t+Δt, may be determined by numerical integration of the motion equations associated with said node i.

For each node i from the plurality of nodes, the acceleration $a_i$, at the time t+Δt, may be determined by applying Newton's second law, i.e. by adding the forces applied to said node i by the links linking said nodes to further nodes j from the plurality of nodes 200 of the geological model.

For example $m_i a_i = \sum_j f^{ij}$ where the sum is performed on the set of nodes j from the plurality of nodes linked to the node i by a link from the plurality of links and where $f^{ij}$ is the force applied by the node j on the node i, and where $m_i$ is the mass of the node i.

The numeric stability of the computation is ensured if the time interval is small against an elastic response time $\Delta_t^{critical} = \pi \sqrt{m_i/k}$, where $m_i$ is herein the mass of the nodes 200 of the geological model 100, for example of the most rigid geological phase 1 of the material 1. The mass $m_i$ of the nodes 200 of a geological phase of the geological model 100 may be readily obtained on the basis of the density of said geological phase.

In this second embodiment, it is further possible to include a viscous damping term τ suitable for dissipating self-maintained oscillations. The viscous damping term τ is for example obtained on the basis of the coefficient of restitution of the material or the geological phase modelled by the geological model.

The method then comprises, for each link i from the plurality of links 300, the determination of a force applied to the link $f_{app}^i$.

In the embodiment wherein the links are fragile springs merely transmitting a normal force $f_{norm}$, the force applied to the link i, $f_{app}^i$ is for example given by the normal force $f_{norm}^i$ described above $$f_{app}^i = f_{norm}^i = k^i \Delta l^i$$

If the force $f_{app}^i$ applied to the link i is greater than the force threshold value $f_c^i$ of the link i, the link i is a link to be broken 305 and the following two operations are implemented.

With reference to FIGS. 3a to 3d, firstly, for each of the two nodes 201, 202 linked together by the link to be broken 305, an operation is performed to create a contact sphere 400 associated with said node (step 1510, CRT_SPH).

A first contact sphere 410 and a second contact sphere 420 are thus created and associated respectively with the first node 201 and the second node 202 linked together by the link to be broken 305.

The contact spheres 400 form a plurality of contact spheres. The contact spheres 400 each comprise a centre 430 having a central spatial position $r_{sphere}^i$, for example similar to the spatial position $r_i$ of the node i associated with the contact sphere 400. The contact spheres 400 also comprise a predefined reference radius R.

The reference radius R may for example be equal to half the reference length of the link to be broken. The reference radius may also be less than half of the reference length $l_0$ of the link to be broken 350, for example less than half the reference length $l_0$ of the link to be broken 350 of a predetermined value ΔR or having a predetermined ratio $\gamma_R$ with half of the reference length $l_0$ of the link to be broken 350.

In one alternative embodiment of the invention, the contact spheres 400 may not have the shape of a perfect sphere but a polyhedron shape more or less similar to a sphere. As a general rule, "contact spheres" are thus bodies having the dimensionality of the lattice and a certain spatial extension. In the example of a three-dimensional lattice, the contact spheres are thus three-dimensional bodies. In further examples of embodiments, the contact spheres may be two-dimensional bodies such as discs or one-dimensional bodies such as segments.

A further operation comprises the elimination of the link to be broken 350 from the plurality of links of the geological model 100 (step 1520, SPR_LN).

As illustrated in FIG. 3d, these operations enable the creation of cracks and fragments in the geological model at the location of the links subject to an excessive applied force.

With reference now more specifically to FIG. 4, once the links to be broken have been eliminated and the contact spheres created, the methods comprises the determination of a plurality of contacts between spheres 500 (step 1600, DET_CTCT). The plurality of contacts between spheres 500 comprises at least one contact between spheres and may particularly be reduced to one contact between spheres. Each contact between spheres 500 associates two contact spheres 410, 420 from the plurality of contact spheres 400.

A contact between spheres 500 associates in particular two contact spheres 410, 420 such that the centres 430 of said two contact spheres 410, 420 are separated by a separation distance d less than or equal to the sum of the reference radii R of said two contact spheres 410, 420.

Once the plurality of contacts between spheres 500 have been determined, for each contact between spheres i from the plurality of contacts between spheres, an interaction force $f_{inter}^i$ is determined between the two contact spheres 410, 420 from the plurality of contact spheres 400 associated by said contact between spheres i (step 1700, DET_FINTER).

For this purpose, it is possible for example to associate with each contact between spheres i from the plurality of contacts between spheres 500:
- a plane of contact $P_i$ between spheres,
- a normal component of the interaction force $f_{inter}^{N,i}$, normal to the plane of contact $P_i$, and
- a tangential component of the interaction force $f_{inter}^{T,i}$, comprised in the plane of contact $P_i$.

The interaction force $f_{inter}^i$ is then the sum of the normal component of the interaction force $f_{inter}^{N,i}$ and of the tangential component of the interaction force $f_{inter}^{T,i}$.

More specifically, the normal component of the interaction force $f_{inter}^{N,i}$ may be for example an elastic component proportional to an interpenetration distance $D_{inter}^i$ of the two contact spheres 410, 420 associated by said contact between spheres i. A normal interaction constant value $k_{inter}^N$ may be associated with said normal component of the interaction force $f_{inter}^{N,i}$ such that the normal component of the interaction force is $f_{inter}^{N,i} = k_{inter}^N D_{inter}^i$.

Furthermore, the tangential component of the interaction force $f_{inter}^{T,i}$ may be a dissipation component. As such, the tangential component of the interaction force $f_{inter}^{T,i}$ may have an opposite direction to a relative tangential displacement $\vec{v}_r^{T,i}$ of the two contact spheres 410, 420 associated by said contact between spheres i and a modulus proportional to said relative tangential displacement $\|\vec{v}_r^{T,i}\|$. As such, the tangential component of the interaction force $f_{inter}^{T,i}$ may be for example given by $$f_{inter}^{T,i} = -\frac{\vec{v}_r^{T,i}}{\|\vec{v}_r^{T,i}\|} k_{inter}^T \|\vec{v}_r^{T,i}\|,$$

where $k_{inter}^T$ is a tangential interaction constant value.

In alternative embodiments of the invention, the tangential and normal components of the interaction force $f_{inter}^{T,i}$ may adopt different forms.

For each contact between spheres i from the plurality of contacts between spheres 500, the method may further comprise a step for transmitting said interaction force $f_{inter}^i$ to each link l from the plurality of links 300 such that, from the two nodes of the plurality of nodes 200 linked together by said link l, at least one node is associated with a contact sphere 400 associated with said contact between spheres i (step 1800, TRSM_FINTER).

In this way, the interaction forces generated at the location of the contacts between spheres 500 may be redistributed in the geological model 100.

The step for determining a spatial position of the nodes from the plurality of nodes detailed above (step 1300, DET_POS) may advantageously account for the plurality of contacts between spheres 500.

As such, for each node i associated with a contact sphere 400 associated with a contact between spheres 500, the implementation of the integration algorithm may account for the interaction force $f_{inter}$ between the two contact spheres 410, 420 associated by said contact between spheres 500, for example as follows.

For each node i associated with a contact sphere m, the acceleration $a_i$, at the time $t+\Delta t$, may be determined by applying Newton's second law, by adding the forces applied to said node i by the links l linking said node i to further nodes from the plurality of nodes 200 of the geological model and by also adding the forces $f_{inter}$ applied by the contact spheres n associated with the contact sphere m by a contact between spheres 500.

As such, for example, the acceleration $a_i$ may take the form $m_i a_i = \Sigma_j f^{ij} + \Sigma_n f_{inter}^{mn}$ where $m_i$ is the mass of the node i, where the first sum is performed on the set of nodes j from the plurality of nodes 200 linked to the node i by a link from the plurality of links 300, where $f^{ij}$ is the force applied by the node j on the node i, where the second sum is performed on the set of contact spheres m from the plurality of contact spheres 400 such that the contact sphere n is associated with the contact sphere m associated with the node i by a contact between spheres 500 and where $f_{inter}^{mn}$ is the interaction force between the contact spheres n and the contact sphere m associated with the node i.

The steps of the method described above may be repeated at least once, apart from the step for defining the geological model. Advantageously, the steps of the method described above, with the exception of the step for defining the geological model, may be repeated while a test condition has not been met, for example a displacement of the spatial position of at least one node from the plurality of nodes between an iteration n and an iteration n+1 of the method is greater than a predefined spatial displacement.

The method then outputs a damaged geological model. The term "damaged geological model" denotes herein in particular a geological model wherein the spatial positions of the nodes and the links are modified relative to the initial geological model.

FIG. 4 represents an example of a device for determining damage to a geological model in one embodiment of the invention.

In this embodiment, the device comprises a computer 400, comprising a memory 404 for storing instructions for implementing the method, the data such as or characteristics detailed above of the nodes, links, contact spheres, contacts between spheres, for example the positions, velocities and accelerations of the nodes, and the temporary data for carrying out the various steps of the method as described above.

The computer further comprises a circuit for determining damage to a geological model. This circuit may be, for example:
- a processor suitable for interpreting instructions in computer program form, or
- an electronic card wherein the step of the method according to the invention are described in the silicon, or a programmable electronic chip such as an FPGA ("Field-Programmable Gate Array") chip.

This computer comprises an input interface 402 for receiving data as cited above, and an output interface 403 for supplying data. Finally, the computer comprises, to enable easy interaction with a user, a screen 405, a mouse and a keyboard 406. The output interface 406 may be combined with a video output enabling a display on the screen 401.

Moreover, the functional diagram given in FIG. 2 is a typical example of a program wherein some instructions may be carried out on the equipment described. As such, FIG. 2 may correspond to the organisation chart of the general algorithm of a computer program according to the invention.

Obviously, the present invention is not restricted to the embodiments described above by way of examples; it extends to further alternative embodiments.

Further embodiments are possible.

The invention claimed is:

1. A method for determining damage to a geological model, said method being implemented by computer means, said geological model comprising a plurality of nodes and a plurality of links, each link from the plurality of links linking together two nodes from the plurality of nodes, the method comprising the following steps, for each link i from the plurality of links:
determining a force applied $f_{app}^{i}$ to said link,
if said force is greater than a force threshold value $f_c^i$:
for each node j of the two nodes from the plurality of nodes linked together by said link i, creating a contact sphere associated with said node j,
eliminating said link i,
determining a plurality of contacts between spheres comprising at least one contact between spheres, each contact between spheres from the plurality of contacts between spheres associating two contact spheres from the plurality of contact spheres, wherein
a first plurality of nodes from the plurality of node of the geological model is associated with a first geological phase modeled by the geological model,
a second plurality of nodes from the plurality of nodes of the geological model is associated with a second geological phase modeled by the geological model,
a plurality of first geological phase links from the plurality of links of the geological model consists of links from the plurality of links linking together two nodes from the first plurality of nodes, with each link from the plurality of first geological phase links is associated a first geological phase rigidity value $k^{\Phi 1}$ and a first geological phase force threshold value $f_c^{\Phi 1}$ determined on the basis of an elastic modulus value of the first geological phase $E^{\Phi 1}$ modeled by the geological model and a tensile strength threshold value of the first geological phase $\sigma^{\Phi 1}$ modeled by the geological model,
a plurality of second geological phase links from the plurality of links of the geological model consists of links from the plurality of links linking together two nodes from the second plurality of nodes, with each link from the plurality of second geological phase links is associated a second geological phase rigidity value $k^{\Phi 2}$ and a second geological phase force threshold value $f_c^{\Phi 2}$ determined on the basis of an elastic modulus value of the second geological phase $E^{\Phi 2}$ and a tensile strength threshold value of the second geological phase $\sigma^{\Phi 2}$ modeled by the geological model,
a plurality of interface links from the plurality of links of the geological model consists of links from the plurality of links linking together a node of the first plurality of nodes and a node from the second plurality of nodes, with each link from the plurality of interface links is associated an interface rigidity value $k^{interface}$ and an interface force threshold value $f_c^{interface}$, and wherein the first geological phase rigidity value $k^{\Phi 1}$ associated with one of the first geological phase link is different to the second geological phase rigidity value $k^{\Phi 2}$ associated with one of the second geological phase link and/or the first geological phase force threshold value $f_c^{\Phi 1}$ associated with one of the first geological phase link is different to the second geological phase force threshold value $f_c^{\Phi 2}$ associated with one of the second geological phase link.

2. The method according to claim 1, wherein, for each contact between spheres i from the plurality of contacts between spheres, the method further comprising,
determining an interaction force $f_{inter}^{i}$ between the two contact spheres associated by said contact between spheres i, and
for each link l from the plurality of links such that, of the two nodes from the plurality of nodes linked together by said link l, at least one node is associated with a contact sphere associated with said contact between spheres i, transmitting said interaction force $f_{inter}^{i}$ to said link l.

3. The method according to claim 2, wherein, with each contact between spheres i from the plurality of contacts between spheres is associated with,
a plane of contact $P_i$ between spheres,
a normal component of the interaction force $f_{inter}^{N,i}$, normal to the plane of contact $P_i$, and wherein
a tangential component of the interaction force $f_{inter}^{T,i}$, comprised in the plane of contact $P_i$, and wherein
the normal component of the interaction force $f_{inter}^{N,i}$ is a component proportional to an interpenetration distance $D_{inter}^{i}$ of the two contact spheres associated by said contact between spheres i, and
the tangential component of the interaction force $f_{inter}^{T,i}$ is a component of opposite direction to a relative tangential displacement $\vec{v}_r^{T,i}$ of the two contact spheres associated by said contact between spheres i, and modulus proportional to said relative tangential displacement $\vec{v}_r^{T,i}$.

4. The method according to claim 1, wherein a rigidity value $k^i$, the force threshold value $f_c^i$ and a reference length value $l_0^i$ are associated with each link i from the plurality of links, said rigidity values $k^i$ and the force threshold values $f_c^i$ being determined on the basis of the elastic modulus value of the first geological phase $E^{\Phi 1}$ and the tensile strength threshold value of the first geological phase $E^{\Phi 1}$ modeled by the geological model and/or the elastic modulus value of the second geological phase $E^{\Phi 2}$ and the tensile strength threshold value of the second geological phase $E^{\Phi 2}$ modeled by the geological model.

5. The method according to claim 1, wherein the links from the plurality of links and the nodes from the plurality of nodes are arranged in a disordered regular lattice, preferably in a lattice such as a statistical distribution of reference length values $l_0$ or a statistical distribution of rigidity values k, associated with the links from the plurality of links, is a unimodal statistical distribution.

6. The method according to claim 1, further comprising the following steps,
applying a plurality of limit conditions to a plurality of limit nodes from the plurality of nodes, and for each node i from the plurality of nodes, determining a spatial position $r_i$ of said node i.

7. The method according to claim 6, wherein the determination of the spatial position $r_i$ for each node i from the plurality of nodes comprises either a minimization of a potential energy $\varepsilon_p$ of the geological model, or an integration of a plurality of motion equations associated with the nodes.

8. A device for determining damage to a geological model, said geological model comprising a plurality of nodes and a plurality of links, each link from the plurality of links linking together two nodes from the plurality of nodes, the device comprising a processor, wherein the processor performs the following:

for each link from the plurality of links:
determining a force applied to said link,
if said force is greater than a force threshold value:
for each node of the two nodes from the plurality of nodes linked together by said link, creating a contact sphere associated with said node, and
eliminating said link,
determining a plurality of contacts between spheres comprising at least one contact between spheres, each contact between spheres associating two contact spheres from the plurality of contact spheres, wherein
a first plurality of nodes from the plurality of node of the geological model is associated with a first geological phase modeled by the geological model,
a second plurality of nodes from the plurality of nodes of the geological model is associated with a second geological phase modeled by the geological model,
a plurality of first geological phase links from the plurality of links of the geological model consists of links from the plurality of links linking together two nodes from the first plurality of nodes, with each link from the plurality of first geological phase links is associated a first geological phase rigidity value $k^{\Phi i}$ and a first geological phase force threshold value $f_c^{\Phi 1}$ determined on the basis of an elastic modulus value of the first geological phase $E^{\Phi 1}$ modeled by the geological model and a tensile strength threshold value of the first geological phase $\sigma^{\Phi 1}$ modeled by the geological model,
a plurality of second geological phase links from the plurality of links of the geological model consists of links from the plurality of links linking together two nodes from the second plurality of nodes, with each link from the plurality of second geological phase links is associated a second geological phase rigidity value $k^{\Phi 2}$ and a second geological phase force threshold value $f_c^{\Phi 2}$ determined on the basis of an elastic modulus values $E^{\Phi 2}$ and of the second geological phase and a tensile strength threshold value $\sigma^{\Phi 2}$ of the second geological phase modeled by the geological model,
a plurality of interface links from the plurality of links of the geological model consists of links from the plurality of links linking together a node of the first plurality of nodes and a node from the second plurality of nodes, with each link from the plurality of interface links is associated an interface rigidity value $k^{interface}$ and an interface force threshold value $f_c^{interface}$, and
wherein the first geological phase rigidity value $k^{\Phi 1}$ associated with one of the first geological phase link is different to the second geological phase rigidity value $k^{\Phi 2}$ associated with one of the second geological phase link and/or the first geological phase force threshold value $f_c^{\Phi 1}$ associated with one of the first geological phase link is different to the second geological phase force threshold value $f_c^{\Phi 2}$ associated with one of the second geological phase link.

9. A computer program product comprising instructions for the implementation, when this program is executed by a processor, for determining damage to a geological model, said geological model comprising a plurality of nodes and a plurality of links, each link from the plurality of links linking together two nodes from the plurality of nodes, comprising the following steps:

for each link from the plurality of links:
determining a force applied to said link,
if said force is greater than a force threshold value:
for each node of the two nodes from the plurality of nodes linked together by said link, creating a contact sphere associated with said node, and
eliminating said link,
determining a plurality of contacts between spheres comprising at least one contact between spheres, each contact between spheres associating two contact spheres from the plurality of contact spheres, wherein
a first plurality of nodes from the plurality of node of the geological model is associated with a first geological phase modeled by the geological model,
a second plurality of nodes from the plurality of nodes of the geological model is associated with a second geological phase modeled by the geological model,
a plurality of first geological phase links from the plurality of links of the geological model consists of links from the plurality of links linking together two nodes from the first plurality of nodes, with each link from the plurality of first geological phase links is associated a first geological phase rigidity value $k^{\Phi 1}$ and a first geological phase force threshold value $f_c^{\Phi 1}$ determined on the basis of an elastic modulus value of the first geological phase $E^{\Phi 1}$ modeled by the geological model and a tensile strength threshold value of the first geological phase $\sigma^{\Phi 1}$ modeled by the geological model,
a plurality of second geological phase links from the plurality of links of the geological model consists of links from the plurality of links linking together two nodes from the second plurality of nodes, with each link from the plurality of second geological phase links is associated a second geological phase rigidity value $k^{\Phi 2}$ and a second geological phase force threshold value $f_c^{\Phi 2}$ determined on the basis of elastic modulus values $E^{\Phi 2}$ of the second geological phase and tensile strength threshold values $\sigma^{\Phi 2}$ of the second geological phase modeled by the geological model,
a plurality of interface links from the plurality of links of the geological model consists of links from the plurality of links linking together a node of the first plurality of nodes and a node from the second plurality of nodes, with each link from the plurality of interface links is associated an interface rigidity value $k^{interface}$ and an interface force threshold value $f_c^{interface}$, and
wherein the first geological phase rigidity value $k^{\Phi 1}$ associated with one of the first geological phase link is different to the second geological phase rigidity value $k^{\Phi 2}$ associated with one of the second geological phase link and/or the first geological phase force threshold value $f^c_{\Phi 1}$ associated with one of the first geological phase link is different to the second geological phase force threshold value $f_c^{\Phi 2}$ associated with one of the second geological phase link.

* * * * *